US008489258B2

(12) United States Patent
Paschall, II et al.

(10) Patent No.: US 8,489,258 B2
(45) Date of Patent: Jul. 16, 2013

(54) PROPULSIVE GUIDANCE FOR ATMOSPHERIC SKIP ENTRY TRAJECTORIES

(75) Inventors: Stephen C. Paschall, II, Cambridge, MA (US); Garrett O. Teahan, Hermosa Beach, CA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 558 days.

(21) Appl. No.: 12/732,892

(22) Filed: Mar. 26, 2010

(65) Prior Publication Data

US 2010/0250031 A1 Sep. 30, 2010

Related U.S. Application Data

(60) Provisional application No. 61/164,207, filed on Mar. 27, 2009.

(51) Int. Cl.
*B64G 1/40* (2006.01)
*G05D 1/04* (2006.01)

(52) U.S. Cl.
USPC .......... 701/13; 701/531; 244/158.1; 244/164; 244/169; 244/171.1

(58) Field of Classification Search
USPC ................ 701/13, 531; 244/158.1, 164, 169, 244/171.1
See application file for complete search history.

(56) References Cited

U.S. PATENT DOCUMENTS

| | | | |
|---|---|---|---|
| 2,995,320 A | 8/1961 | Gottschalk | |
| 3,120,364 A | 2/1964 | Stalony-Dobrzanski | |
| 3,160,366 A | 12/1964 | De Graffenried | |
| 3,164,338 A | 1/1965 | Cooper et al. | |
| 3,301,507 A | 1/1967 | Mayo et al. | |
| 3,330,503 A | 7/1967 | Love et al. | |
| 5,064,151 A | 11/1991 | Cerimele et al. | |
| 5,628,476 A | 5/1997 | Soranno et al. | |
| 6,257,527 B1 | 7/2001 | Redding, Jr. et al. | |
| 6,360,994 B2 | 3/2002 | Hart et al. | |
| 6,530,543 B2 | 3/2003 | Redding, Jr. et al. | |
| 6,827,313 B1 | 12/2004 | Aldrin | |
| 7,219,859 B2 | 5/2007 | Johnson et al. | |
| 2001/0010347 A1 | 8/2001 | Hart et al. | |
| 2006/0219846 A1 | 10/2006 | Johnson et al. | |
| 2007/0128582 A1 | 6/2007 | Anderson et al. | |

OTHER PUBLICATIONS

Putnam, et al., Improving Lunar Return Entery Footprints Using Enhanced Skip Trajectory Guidance, Space 2006 Conference San Jose, CA, Sep. 19-21, 2006, The Draper Technology Digest, vol. 11, 2007.*
Joshi, et al., Predictor-Corrector Reentry Guidance Algorithm with Path Constraints for Atmospheric Entry Vehicles, Journal of Guidance, Control, and Dynamics, vol. 30, No. 5, Sep.-Oct. 2007.*
Bairstow, Reentry Guidance with Extended Range Capability for Low L/D Spacecraft,S.M. Thesis, Department of Aeronautics and Astronautics, MIT, Feb. 2006.*

(Continued)

*Primary Examiner* — Mary Cheung
*Assistant Examiner* — Michael Berns
(74) *Attorney, Agent, or Firm* — Goodwin Procter LLP

(57) ABSTRACT

The invention set forth herein describes propulsive guidance methods and apparatus for controlling and shaping an atmospheric skip reentry trajectory for a space vehicle. Embodiments of the invention may utilize a powered explicit guidance algorithm to provide a closed-loop control method for controlling a space vehicle during a skip reentry maneuver.

17 Claims, 3 Drawing Sheets

OTHER PUBLICATIONS

Spratlin, An Adaptive Numeric Predictor-Corrector Guidance Algorithm for Atmospheric Entry Vehicles, S.M. Thesis, Department of Aeronautics and Astronautics, MIT, May 1987.*

Tedesco, et al., Crew Exploration Vehicle Service Module Ascent Abort Coverage, AIAA Guidance, Navigation, and Control, Aug. 20-23, 2007, Hilton Head, SC.*

Springmann, P., Lunar Descent Using Sequential Engine Shutdown, S.M. Thesis, Department of Aeronautics and Astronautics, MIT, Feb. 2006.*

PredGuid Entry Guidance for Orion Return from Low Earth Orbit, Putnam et al., Jan. 2009.*

"Crew Exploration Vehicle," http://users.wpi.edu/naida/esas/ESAS.Report.05.PDF Dec. 2005.

"Reentry Vehicles: Spheres vs. Blunt Bodies," http://www.hq.nasa.gov/pao/History/SP-4209/ch3-4.htm (First viewed Dec. 2007, printed Apr. 2010).

Dukeman, G. A., "Closed-Loop Nominal and Abort Atmosphere Ascent Guidance for Rocket-Powered Launch Vehicles," Ph.D. Dissertation, Georgia Institute of Technology, May 2005.

McHenry et al, "Space Shuttle Ascent Guidance, Navigation, and Control," The Journal of the Astronautical Sciences, vol. XXVII, No. 1, pp. 1-38, Jan.-Mar. 1979.

Putnam et al., "Improving Lunar Return Entry Footprints Using Enhanced Skip Trajectory Guidance," Space 2006 Conference, Sep. 2006.

Tedesco et al, "Crew Exploration Vehicle Service Module Ascent Abort Coverage," American Institute of Aeronautics and Astronautics, Aug. 2007.

* cited by examiner

PROPULSIVE GUIDANCE FOR ATMOSPHERIC SKIP ENTRY TRAJECTORIES

CROSS-REFERENCE TO RELATED APPLICATIONS

This application claims priority to and the benefit of U.S. provisional patent application Ser. No. 61/164,207, filed Mar. 27, 2009, the disclosure of which is incorporated herein by reference in its entirety.

FIELD OF THE INVENTION

The present invention relates generally to the field of space vehicle trajectory control and, more particularly, to propulsive guidance techniques to control and shape an atmospheric skip trajectory.

BACKGROUND OF THE INVENTION

Skip reentry is a technique for the controlled entry of a space vehicle into the atmosphere of a planet. The technique involves one or more successive "skips" off the atmosphere of the planet to achieve a greater entry range and/or to slow the space vehicle before final entry. This can be advantageous, for example, to control the location of entry of a space vehicle into a planetary atmosphere, and to decrease the significant amount of heat energy that is generated on the surface of the vehicle during its descent through the atmosphere. The control of the range of the space vehicle afforded by skip reentry can allow the vehicle to reach a landing area further down range from the initial entry point, and/or to reach a designated landing point from a wider range of possible entry times. This may be of particular importance, for example, in abort situations.

In order to perform a skip reentry maneuver, precise guidance of the vehicle is required. For example, if the entry angle is too shallow, the velocity of the vehicle may not be sufficiently reduced to allow for reentry; whereas, if the entry angle is too steep, excessive heating and stress may be imposed on the vehicle structure which could exceed the design limits of the vehicle and result in possible damage or even catastrophic failure of the vehicle structure.

The basic method required for skip reentry is to have the vehicle enter the atmosphere at such an angle, and with sufficient lift, that the forces produced on the vehicle by the atmospheric boundary have the effect of pushing the vehicle back out into space. This process can be repeated a number of times, with the vehicle's velocity being reduced with each successive "skip," in order to control the location and flight conditions of the vehicle upon its final entry into the atmosphere.

Basic skip reentry techniques were utilized by the Soviet unmanned Zond space missions of the 1960s, and were evaluated by NASA, for example during the U.S. Apollo program of the 1960s and 1970s, and more recently in the Space Shuttle program. However, prior methods of performing atmospheric skip trajectory shaping, including the methods developed for the Zond, Apollo, and Space Shuttle programs, have been limited to the use of aero-guidance techniques only. This has, as a result, significantly limited the potential range and targeting precision available to space vehicles performing skip reentry maneuvers.

SUMMARY OF THE INVENTION

The current invention teaches propulsive guidance techniques that allow for continued control of the vehicle trajectory beyond the point where aerodynamic control authority has become insignificant. This additional control authority for an atmospheric skip trajectory utilizes control of the propulsion system for the space vehicle and allows for greater skip range and greater targeting precision. In addition, this technique can account for more forces than a conic gravity field as compared to the traditional aero-guidance approach, namely the non-trivial effects of upper atmospheric aerodynamic forces.

One aspect of the invention includes a method of providing propulsive guidance for atmospheric skip reentry of a space vehicle. The method may include calculating a skip reentry flight trajectory for a space vehicle and determining at least one predicted parameter associated with that trajectory. The method may further include receiving at least one measured parameter from at least one navigation system, comparing at least one predicted parameter with at least one measured parameter, determining whether the difference between at least one predicted parameter and at least one measured parameter exceeds a threshold value, and sending a control signal to a propulsion system of the vehicle to change at least one parameter of the propulsion system if the difference between at least one predicted parameter and at least one measured parameter exceeds the threshold value. At least a portion of this method may be repeated for a plurality of time steps such as, for example, until a final target condition for the skip reentry flight trajectory is reached.

In one embodiment, at least one step is performed by a guidance algorithm, such as, but not limited to, a Powered Explicit Guidance (PEG) algorithm. In one embodiment, at least one predicted parameter and measured parameter may include a cutoff velocity required by the powered explicit guidance algorithm. Determining the cutoff velocity may include using a shooting method to determine a velocity that enables a coasting trajectory to reach a target to within a required tolerance.

In one embodiment, the calculating step includes numerically integrating the equations of motion to account for external forces such as, but not limited to, gravity, atmospheric effects, and/or aerodynamic effects, during a skip maneuver. At least one predicted parameter and/or measured parameter may include at least one of a velocity, an altitude, a position, a flight path angle, a gravitational force, an aerodynamic force, and an orbital inclination. The navigation system may be in communication with an instrument associated with the vehicle.

In one embodiment, the control signal adjusts at least one parameter associated with the propulsion system. The propulsive guidance parameter may include at least one of a thrust force and a thrust direction for at least one engine of the propulsion system. The thrust direction of at least one engine may be controlled by at least one gimbal associated with the engine and/or by reorientation of the vehicle. The control signal may be determined by numerically integrating the equations of motion to account for the difference between at least one predicted parameter and at least one measured parameter.

In one embodiment, the target condition includes at least one of a required velocity, altitude, position, flight path angle, and/or orbital inclination. The method may further include sending a control signal to an aerodynamic surface control system of the vehicle if the difference between at least one predicted parameter and at least one measured parameter exceeds the threshold value.

Another aspect of the invention includes a propulsive guidance system for atmospheric skip reentry of a space vehicle. The propulsive guidance system includes a means for receiving at least one measured parameter from at least one instrument. The propulsive guidance system further includes a Powered Explicit Guidance (PEG) algorithm. The PEG algorithm is adapted to calculate at least one predicted parameter associated with a skip reentry flight trajectory for a space vehicle, compare at least one predicted parameter with at least one measured parameter received from at least one instrument, and calculate at least one control signal for a vehicle propulsion system to at least partially compensate for a difference between at least one predicted parameter and at least one measured parameter. The propulsive guidance system may also include a means for transmitting at least one control signal to the vehicle propulsion system.

In one embodiment, the PEG algorithm is adapted to receive repeatedly at least one measured parameter and calculate at least one control signal for a plurality of time steps.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
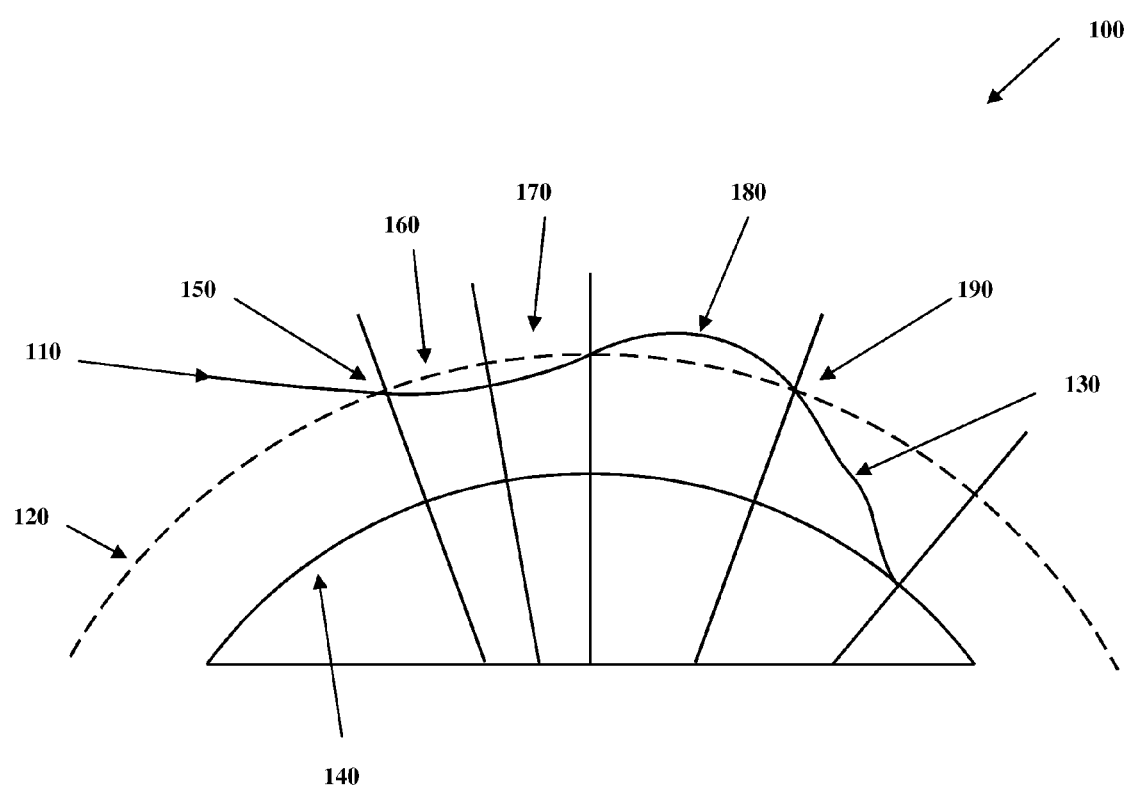
FIG. 1 is a schematic side view of a skip reentry maneuver, in accordance with one embodiment of the invention.

One purpose of the present invention is to provide propulsive guidance methods and associated apparatus for a space vehicle during skip entry into a planet's atmosphere Certain embodiments of the method combine trajectory shaping concepts, such as, but not limited to, those behind the Space Shuttle Linear Terminal Velocity Constraint ("LTVC") Powered Explicit Guidance ("PEG") algorithm, with the flight domain, as experienced by the traditional skip-entry bank-to-steer aero-guidance algorithms. An example PEG algorithm is described in McHenry et al., "Space Shuttle Ascent Guidance, Navigation, and Control," Journal of the Aeronautical Sciences, Vol. XXVII, No. 1, pp. 1-38, January-March 1979, the disclosure of which is incorporated herein by reference in its entirety. As a result, embodiments of the methods described herein allow for the use of both propulsion based guidance and aerodynamic based guidance of the vehicle during skip reentry.

The methods described herein may be used in any appropriate manned or unmanned space vehicle. One embodiment of the invention, for example, includes a method for controlling propulsive guidance for atmospheric skip reentry of a manned space vehicle. Embodiments of the invention may be used in methods and apparatus for manned or unmanned, reusable or single-use, powered space vehicles having propulsive guidance. In certain embodiments, the invention may be used with space vehicles having both propulsive guidance mechanisms and aerodynamic control surfaces for guided flight through the atmosphere. Example vehicles include, but are not limited to, the U.S. Space Shuttle.

One major challenge for space missions is adequately controlling the reentry of the space vehicle into the Earth's, or another planet's, atmosphere. One method that has been developed for entry into a planet's atmosphere is skip reentry, wherein the space vehicle performs one or more successive "skips" off the atmosphere of the planet to achieve a greater entry range and/or to slow the space vehicle before final entry.

Traditionally, skip reentry into a planet's atmosphere has involved aero-guidance of the space vehicle, wherein aerodynamic control surfaces on the space vehicle are utilized to control the flight path of the vehicle as it enters the planet's atmosphere and provides sufficient guidance to allow the vehicle to perform a skip maneuver. However, aero-guidance is limited in that aerodynamic control authority is only available to assist in guiding the flight path where the vehicle is sufficiently immersed within the atmosphere to allow the aerodynamic surfaces of the vehicle to function as such. This severely limits the potential range and targeting precision available to a space vehicle employing aero-guidance reentry.

The methods described herein provide techniques for expanding the range and increasing the targeting precision available during skip reentry maneuvers by utilizing the space vehicle's propulsion systems to provide flight control even where the vehicle is at a sufficient altitude such that the aerodynamic surfaces do not provide sufficient control functionality.

An example of a skip reentry maneuver for a space vehicle is shown in FIG. 1. In this embodiment, the skip reentry maneuver 100 includes a flight path 110 that includes one skip off of the edge of the atmosphere 120 before final descent 130 towards the surface of the planet 140. To perform the skip reentry maneuver 100, the vehicle makes an initial entry 150 into the atmosphere 120 before performing a pull-up maneuver 160 and controlled climb 170 back out of the edge of the atmosphere 120. This pull-up maneuver is traditionally achieved through the controlled interaction of the aerodynamic control surfaces with the atmosphere 120. The space vehicle then skips (or travels) 180 outside the atmosphere 120 for a distance before finally reentering 190 the atmosphere 120 and proceeding along its descent 130 down to the surface of the planet. In certain embodiments, only a single "skip" is required to provide the desired velocity reduction and/or entry location. In alternative embodiments, multiple "skips" may be executed before final reentry.

In traditional aero-guidance reentry, the skip 180 portion of the maneuver 100 is a simple unpowered ballistic coast, with the distance that the skip 180 portion of the maneuver covers before final reentry 190 determined by the exit velocity direction and magnitude determined by the aerodynamically generated pull-up maneuver 160. This provides limited power and limited controllability, thereby limiting the range of the skip 180 and the accuracy of the vehicle in determining the location of the final reentry 190.

By utilizing the vehicle's propulsive guidance abilities in addition to or in place of the aerodynamic guidance, the present invention is not limited to the use of atmospheric interactions with aerodynamic control surfaces to provide the guidance for the vehicle. As a result, the control and guidance of the vehicle may be extended to provide thrust and guidance prior to the initial entry 150 into the atmosphere and/or beyond the controlled climb 170 and into the skip portion 180. This technique therefore gives a space vehicle the ability to follow skip reentry flight paths that are impossible using aero-guidance alone. As a result, skip reentry trajectories utilizing propulsive guidance provide greater range, greater targeting precision, and more robustness to vehicle and/or environmental uncertainties for a skip trajectory as compared to an aero-guidance-only technique or propulsive technique that assumes exoatmospheric flight. In addition, utilization of a vehicle's propulsive systems to facilitate skip reentry guidance allows for the utilization of skip reentry for powered space vehicles that have limited or no aerodynamic control surfaces.

In order to utilize propulsive guidance during skip reentry maneuvers, a guidance algorithm capable of adjustably controlling the propulsive elements of the space vehicle is utilized. One embodiment of the invention utilizes a Powered Explicit Guidance (PEG) algorithm to control the propulsion of the vehicle in order to accurately maintain the vehicle on the desired flight path.

PEG algorithms were originally developed for use in guidance of space vehicles, and more particularly the Space Shuttle, during certain stages of its ascent into space after initial launch. These PEG algorithms are closed-loop guidance algorithms based on optimal control theory. In operation, the PEG algorithm calculates a number of parameters needed to guide the vehicle to a desired target position, with the desired flight conditions (such as, but not limited to, velocity and trajectory) upon reaching the target location. The PEG algorithm then compares the desired parameters with the actual parameters measured by the vehicle's instruments and adjusts the vehicle's flight control to account for any discrepancy between the desired flight path and the actual flight path. By repeating this calculation over the course of a maneuver, the flight path can be continually monitored and adjusted to ensure that the vehicle reaches the desired location with the required flight parameters.

Parameters that may be fed-back into the guidance control system for analysis by the PEG algorithm include, but are not limited to, velocity, altitude, position, flight path angle, and orbital inclination. If the PEG algorithm finds a deviation between the predicted parameters required to reach a target position and those actually observed by the vehicle's instruments, the PEG algorithm can send corrective control commands to the guidance system to adjust the propulsion of the vehicle to compensate for the deviation. By solving the optimal vacuum powered flight problem on-board in each guidance update cycle using the current condition as the initial condition of the solution, the PEG algorithm provides an essentially closed-loop control system for control of the flight path of the vehicle.

Upon comparing predicted and measured parameters, the PEG algorithm may send a control signal to adjust one or more parameters of the vehicle's propulsion system to adjust the flight path and compensate for any discrepancy between the predicted and measured parameters. In one embodiment the PEG algorithm may send control signals to adjust at least one of the magnitude and direction of thrust to one or more of the vehicle's engines (through control of the firing of each engine and/or the gimbaling of each engine).

In order to utilize propulsive guidance for skip reentry, a more accurate prediction is required during the skip phase than in an ascent phase because of the high sensitivity of the trajectory to the atmosphere. This sensitivity arises because the vehicle is traveling along the edge of the atmosphere and traveling faster than the satellite velocity for its altitude. If the trajectory is too high or too fast, the spacecraft will go into an orbit similar to an aero-capture or aero-braking maneuver. If the trajectory is to low or slow, the spacecraft will reenter too far away from the desired location to reach the landing target.

Figure 2:
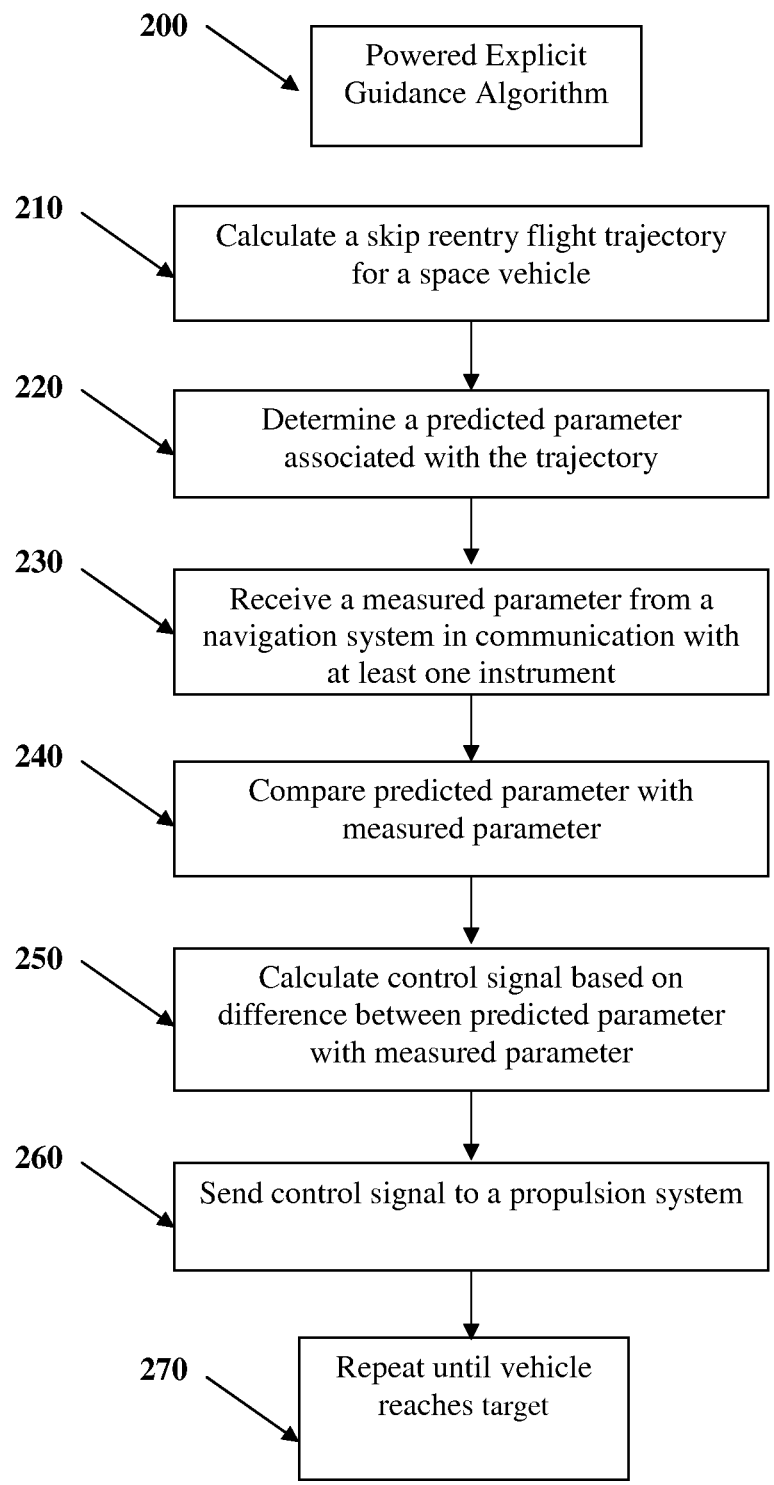
FIG. 2 is a flow chart showing the steps for performing a propulsive guidance atmospheric skip reentry maneuver, in accordance with one embodiment of the invention.

As a result, one embodiment of the invention utilizes a PEG algorithm that may be used to adjust constantly for disturbances in a skip reentry flight path to ensure that the vehicle reaches a desired target location with the required flight parameters, (such as, but not limited to, a required velocity, directional vector, and/or attitude). A block diagram showing one such algorithm is shown in FIG. 2.

In this embodiment, the PEG algorithm 200 calculates a skip reentry flight trajectory for a space vehicle 210, for example by solving for the equations of motion, and determines at least one predicted parameter associated with the trajectory 220. The PEG algorithm then receives at least one measured parameter from a navigation system in communication with at least one instrument 230, and compares this measured parameter with at least one predicted parameter 240. The PEG algorithm 200 may then determine whether the difference between at least one predicted parameter and at least one measured parameter exceeds a threshold value, and then calculates a control signal based on difference between predicted parameter with measured parameter 250. This control signal is then sent to a controller for the vehicles propulsion system 260. This process can then by repeated 270 at a predetermined interval for a plurality of time steps to compensate for any deviations from the calculated skip reentry trajectory, thereby ensuring that the vehicle substantially follows the required flight path to ensure that the skip reentry is performed accurately.

By utilizing the propulsion system of the vehicle, the guidance algorithm is not limited to controlling the flight path of the vehicle during stages of the skip reentry flight path where aero-guidance is possible. In one embodiment, however, aero-guidance may be utilized in conjunction with propulsive guidance to provide further control of the flight path of the vehicle throughout the skip reentry maneuver.

While PEG algorithms may provide an elegant and numerically very efficient solution to the on-orbit guidance problem, one embodiment of the invention may include numerically integrating the equations of motion to account for aerodynamic effects during a skip maneuver. In one embodiment, the technique begins by predicting the vehicle state over one time step by integrating the equations of motion to account for parameters such as, but not limited to, thrust, gravity, and/or aerodynamic forces. The method may then include finding a cutoff velocity required by the PEG algorithm by using a shooting method to determine the velocity that enables a coasting trajectory to reach a target to within some tolerance, where this target can be specified in terms of position, entry angle, and/or velocity, etc. This calculated velocity may then be compared to the predicted velocity. If the difference between the two is small enough compared to the magnitude of the velocity remaining, then guidance has converged and the thrust direction parameters are returned for execution. The technique may be initiated repeatedly, for example at preset discrete, time intervals, throughout the trajectory to ensure that the target is met, despite disturbances in the system.

Figure 3:
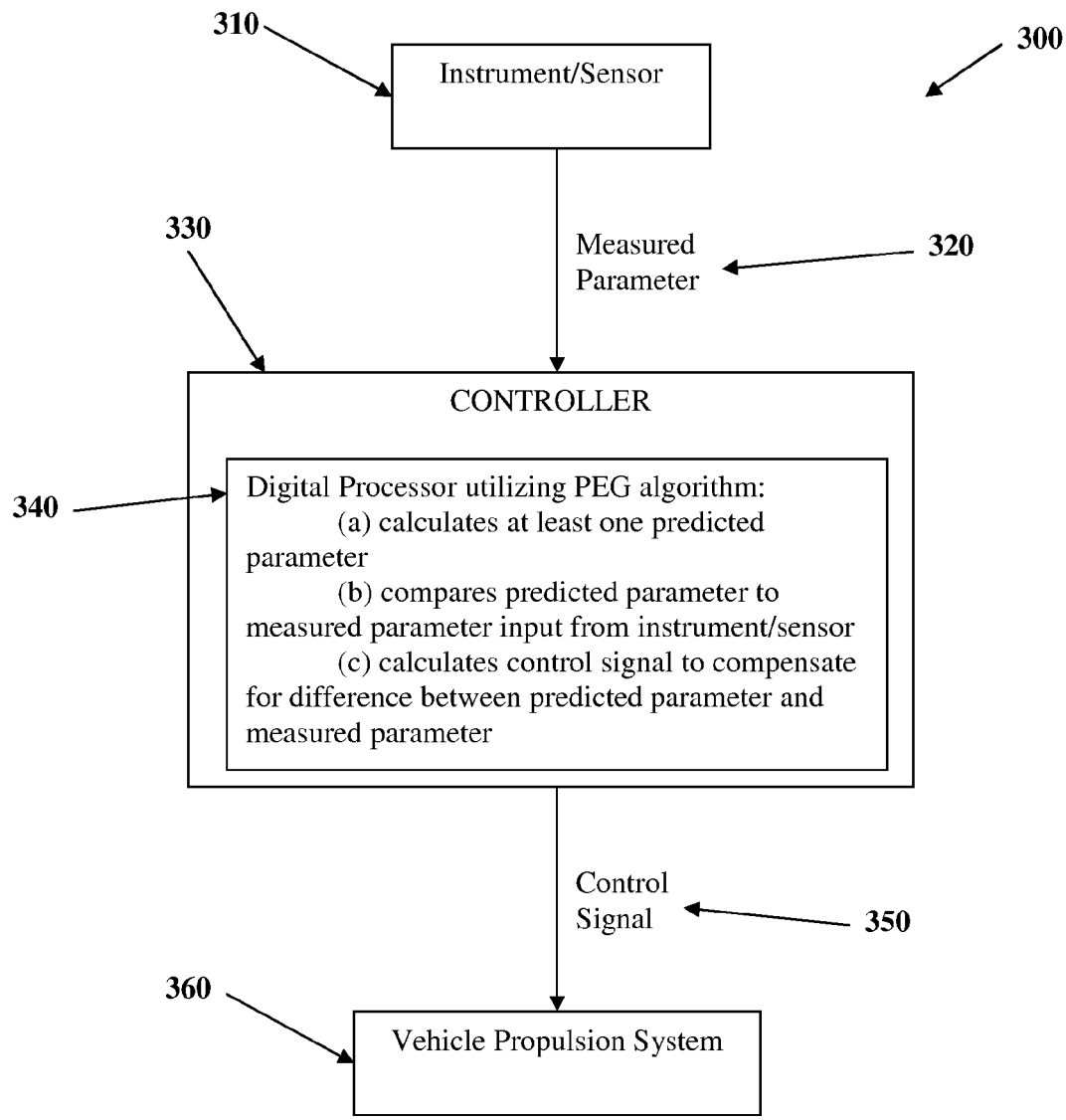
FIG. 3 is a schematic view of a propulsive guidance system for performing a propulsive guidance atmospheric skip reentry maneuver, in accordance with one embodiment of the invention.

An example propulsive guidance system 300 for a space vehicle is shown in FIG. 3. In this embodiment, the propulsive guidance system 300 includes one or more instruments or sensors 310 for measuring one or more parameters to be input into an atmospheric skip reentry algorithm. Such parameters include, but are not limited to, velocity, altitude, position, flight path angle, and/or orbital inclination of the vehicle. The instrument(s) 310 send the measured parameter(s) 320 to a controller 330. The controller 330 may include a means such as a digital processor 340 for calculating one or more required control signals 350 necessary to implement a skip re-entry maneuver. The digital processor 340 may, for example, utilize a PEG algorithm, as described herein, to calculate one or more predicted parameters associated with the required skip reentry flight trajectory, compare the predicted parameter(s) with the measured parameter(s) 320 received from the instrument(s) 310, and calculate one or more control signals 350 to be sent to a vehicle propulsion system 360 to compensate for differences between the predicted parameter(s) and measured parameter(s) 320.

The one or more control signals 350 are transmitted to the vehicle propulsion system 360, which operates to adjust the flight of the vehicle to direct it on the correct flight path calculated by the controller 330 and necessary to perform the required skip maneuver. The control signals 350 may, for example, control various elements of a vehicle propulsion system 360, e.g. to adjust at least one of the magnitude and direction of thrust to one or more of the vehicle's engines through, for example, control of the firing of each engine and/or the gimbaling of each engine. In certain embodiments, other elements of a space vehicle propulsion system 360 may be controlled, including, but not limited to, one or more maneuvering thrusters and/or one or more aerodynamic control surfaces in addition to, or in place of, the vehicle's engines.

Example algorithms and methods for implementing the propulsive guidance systems described herein are described in "Analysis and Design of Propulsive Guidance for Atmospheric Skip Entry Trajectories", by Teahan, G. O., which was incorporated in U.S. Provisional Application No. 61/164,207, to which this application claims priority, and which is incorporated herein by reference in its entirety.

In an alternative embodiment, the method may include using bank-to-steer aero guidance for the vehicle to provide trajectory control before and after the skip out of the atmosphere. However, this method may be limited for elements such as the control authority during skips and the accuracy for long range skips, and the performance may, in one embodiment, be dependent on environmental uncertainties.

Example Algorithm

An example PEG algorithm for use in skip reentry applications, in which the propulsive force acts over a finite time period, is described below.

Allowing the propulsive force to act over a finite time period, as opposed to acting impulsively, increases the complexity of the calculations, as the dynamics of the system change over time which couples into the amount of force required to perform the desired maneuvers. However, calculating for a finite propulsive force time provides for a more accurate guidance algorithm than can generally be achieved through use of impulsive force limitations. In addition to simply allowing a force to occur for a finite amount of time, the thrust direction is also free to point in any direction needed. In an alternative embodiment, an algorithm utilizing a fixed thrust direction may be used.

In one embodiment, the algorithm may include a standard or augmented Powered Explicit Guidance algorithm used to handle all powered flight phases, except for the first stage of launch, of manned space vehicles. The PEG algorithm is based on the linear tangent steering law and provides guidance for a variety of different flight regimes with widely varying cutoff constraints and thrust-to-weight ratios. PEG was initially derived from the solution to the minimum-time-to-orbit problem for a flat Earth with uniform gravity and no atmosphere and is used to find the thrust direction angle ($\beta$) necessary to place a vehicle at a given altitude and desired velocity in the minimum amount of time. The final downrange position is left unconstrained and the optimal control law is given by the equation:

$$\tan \beta = c_1 + c_2 t \tag{1}$$

where t=time and $c_1$ and $c_2$ are constants.

However, using the flat Earth, uniform gravity, and no atmosphere assumptions may not provide an accurate enough description of the dynamics of the problem. As a result, the guidance scheme used for skip reentry, in accordance with one embodiment of the invention, provides computationally efficient methods that automate the process for finding a near optimal solution that is valid without being limited by these assumptions.

Guidance Equations

For a vehicle of mass (m), with thrusters acting with a force (F), the equation of motion is given by:

$$\ddot{r} = \frac{F}{m}\hat{\lambda}_t + a_g \tag{2}$$

where $a_g$ is acceleration due to gravity and $\ddot{r}$ is the second time derivative of the position.

The thrust direction vector, $\hat{\lambda}_t$ is restricted to a profile defined by:

$$\hat{\lambda}_t = \hat{\lambda} + \dot{\lambda}(t - t_{ref}) \tag{3}$$

where $\hat{\lambda}$ is a vector pointing the direction of the velocity-to-be-gained, $\dot{\lambda}$ is the time derivative of $\hat{\lambda}_t$, and $t_{ref}$ is a reference time. All three of the parameters in this equation are constants. The resulting equation of motion is therefore:

$$\ddot{r} - a_g = \frac{F}{m}\left(\hat{\lambda} + \dot{\lambda}(t - t_{ref})\right) \tag{4}$$

Four thrust scalar integrals and two gravity vector integrals, examples of which are shown below in equations (5) through (10), may be used to integrate equation (4):

$$L = \int_0^{t_{go}} \frac{F}{m} dt \tag{5}$$

$$J = \int_0^{t_{go}} \frac{F}{m} t\, dt \tag{6}$$

$$S = \int_0^{t_{go}} \int_0^t \frac{F}{m} ds\, dt \tag{7}$$

$$Q = \int_0^{t_{go}} \int_0^t \frac{F}{m} s\, ds\, dt \tag{8}$$

$$v_g = \int_0^{t_{go}} a_g\, dt \tag{9}$$

$$r = \int_0^{t_{go}} \int_0^t a_g\, ds\, dt \tag{10}$$

where $t_{go}$ is the time-to-go and L, J, S, and Q are thrust integrals. Therefore, integrating Equation (4) over the length of a burn gives:

$$v_{go} = v_d - v - v_g = L\hat{\lambda} + (J - t_{ref} L)\dot{\lambda} \tag{11}$$

where $v_{go}$ is the velocity-to-be-gained and $v_d$ is the desired final velocity. Integrating once more gives:

$$r_{go} = r_d - r - vt_{go} - r_g = S\hat{\lambda} + (Q - t_{ref}S)\dot{\lambda} \quad (12)$$

where $r_{go}$ is the position-to-be-gained and $r_d$ is the desired final position.

The result of Equations (11) and (12) is a system of five equations and seven unknowns. There are only five equations, because the final downrange position is left unconstrained. The seven unknowns are the components of $\hat{\lambda}$ and $\dot{\lambda}$ and the remaining burn time, $t_{go}$. The unitization of Equation (3) adds one more equation. The final constraint needed to fully determine the system is one that enforces the orthogonality between $\hat{\lambda}$ and $\dot{\lambda}$, namely:

$$\hat{\lambda} \cdot \dot{\lambda} = 0 \quad (13)$$

The constraint in Equation (13) can be used with Equations (11) and (12) to solve for the unknowns. First, $\hat{\lambda}$ can be found by taking the dot product of $\hat{\lambda}$ with Equation (11) to get:

$$\hat{\lambda} \cdot v_{go} = L \quad (14)$$

Given that $\hat{\lambda}$ is a unit vector, $L = v_{go}$, and:

$$\hat{\lambda} = \frac{v_{go}}{v_{go}} \quad (15)$$

A similar manipulation can be used to find $\dot{\lambda}$. The dot product of $\hat{\lambda}$ with Equation (12) gives:

$$\hat{\lambda} \cdot r_{go} = S \quad (16)$$

However, $r_d$ has an unconstrained downrange component and thus the unknown component of $r_{go}$ must be found using Equation (16). Once $r_{go}$ is fully specified, Equation (12) is used to solve for $\dot{\lambda}$ as:

$$\dot{\lambda} = \frac{r_{go} - S\hat{\lambda}}{Q - t_{ref}L} \quad (17)$$

where $t_{ref}$ is defined such that Equation (11) is consistent with Equation (15). This yields:

$$t_{ref} = \frac{J}{L} \quad (18)$$

In one embodiment, a predictor-corrector algorithm is used to assist the guidance solution in converging to a near optimal solution. This may require assumptions about the nature of Earth's gravity field and the vehicle's thrust profile. These assumptions allow the calculation of the thrust integrals given in Equations (5) through (8). Furthermore, by approximating the gravity integrals in Equations (9) and (10), the position and velocity are at the end of the burn to first order may be predicted. In one embodiment, other thrust integrals that allow one to approximate the velocity and position change due to thrust to second order may be utilized. The predicted position and velocity may then be used to update the desired position and velocity. If the predicted and desired position and velocity have converged to a reasonable tolerance (where tolerance is defined as the ratio of the magnitude of the prediction error to the magnitude of the velocity-to-go) then the guidance loop is complete and the vehicle performs the calculated maneuver. In various embodiments, the required tolerance may be set at a value of between 0.01 and 0.2, or, more particularly, between 0.05 and 0.15 and, for example, at about, or exactly, 0.1. The period may be set at a value of between 1 and 20 seconds, or, more particularly, between 5 and 15 seconds and, for example, at about, or exactly, 10 seconds, where the period determines the iterative rate at which the PEG algorithm, or augmented PEG algorithm, is called throughout the trajectory to ensure the target is met despite disturbances to the system.

In one embodiment, the final downrange position after the skip trajectory maneuver may be unconstrained. In an alternative embodiment, the final position may be constrained through, for example, use of a linear terminal velocity constraint. An example linear terminal velocity constraint, in accordance with one embodiment of the invention, is described below.

The addition of a downrange position constraint may be advantageous, for example, for vehicle on-orbit operations and the de-orbit maneuvers. These maneuvers pose a different problem than that of an ascent maneuver because, for example, a coast phase is needed. This means that the position constraints may no longer be imposed at cutoff and an additional calculation may be required to find the velocity necessary to achieve a desired cutoff condition, i.e. the velocity that enables the spacecraft to reach a desired location with a specified linear relationship between the radial and horizontal components of velocity as:

$$v_r = C_1 + C_2 v_h \quad (19)$$

where $C_1$ and $C_2$ are given.

In this embodiment, the terminal position of the thrusting phase is unconstrained, and Equation (17) is no longer valid. It is also not acceptable to set this parameter to zero, because a constant attitude is not fuel optimal for maneuvers that may traverse a large inertial angle. In one embodiment, a turning rate of approximately 35° of the mean motion of a circular satellite may be optimal, so that the magnitude of $\dot{\lambda}$ becomes:

$$|\dot{\lambda}| = 0.35 \sqrt{\frac{\mu_\oplus}{r^3}} \quad (20)$$

where $\mu_\oplus$ is the gravitational parameter of Earth. In alternative embodiments, larger or smaller turning rates may be used, as appropriate.

The algorithm for finding the cutoff velocity may, in one embodiment, include a method for finding the solution to a second order system of equations, where one equation is the linear relation between the radial and horizontal terminal velocities, shown in Equation (19), and the other is a quadratic constraint created by the geometry of the trajectory:

$$\left(\frac{r_f}{r_0} - \cos\theta\right)v_{h_f}^2 - \left(v_{r_f}\sin\theta\right)v_{h_f} - \frac{\mu_\oplus}{r_f}(1 - \cos\theta) = 0 \quad (21)$$

where subscripts $()_f$ and $()_0$ mean final and initial position or velocity, respectively. These constraints essentially describe the intersection of a line with the hyperbolic locus of velocity vectors. Given Equations (19) and (21), the system will have one, two, or no roots.

Certain embodiments include a method of selecting of the coefficients of Equation (19), $C_1$ and $C_2$. These coefficients may be chosen such that the relationship between the horizontal and radial components of velocity is achieved at the target point. For orbital maneuvers, they are set to zero and the target location is set to the desired apoapsis or periapsis. However, for a de-orbit burn, for example, it may be necessary to set $C_1$ and $C_2$ such that the desired speed and flight path angle is achieved at the initiation of entry.

In one embodiment, a linear terminal velocity constraint (LTVC) method for targeting desired position may assume no aerodynamic effects. While this may be valid for the regime of flight it is used in (e.g. above 120 km), in some embodiments aerodynamics effects cannot be ignored. The perturbing accelerations caused by atmospheric drag may, in certain embodiments, make the coefficients $C_1$ and $C_2$ in Equation (19) highly nonlinear functions of time. Therefore, in one embodiment a different method may be used that accounts for the atmospheric effects during the ballistic phase.

In such an embodiment, an augmented algorithm may be used during a skip phase to account for the high sensitivity of the trajectory to atmospheric conditions. This sensitivity arises because, during skip reentry, the vehicle is traveling along the edge of the atmosphere and traveling faster than the satellite velocity for its altitude. As a result, if the trajectory is too high or too fast, the spacecraft will go into an orbit similar to an aero-capture or aero-braking maneuver, while, if the trajectory is too low or too slow, the spacecraft will reenter too far away from the desired location to reach the landing target. While a standard PEG algorithm provides a relatively elegant and numerically efficient solution to an on-orbit guidance problem, a standard PEG algorithm may, in certain embodiments, be less accurate for skip reenter calculations due, at least in part, to its assumption of a conic trajectory when doing any prediction or correction. This assumption may, in certain embodiments, not be valid for skip reentry maneuvers, because of the highly non-linear effects of aerodynamic forces due to operating in the regime of a skip trajectory.

As a result, one embodiment of the invention includes an augmented algorithm that numerically integrates the equations of motion to circumvent the limitations of more standard PEG algorithms for implementation during a skip maneuver. This solution guarantees that the resultant prediction and correction are accurate to within the tolerances specified (e.g., a tolerance of about, or exactly, 0.1 with a period of about, or exactly, 10 seconds).

In one embodiment, the numerical integration for the predictor enters into the algorithm where Equations (5) to (10) would be approximated using a linear or quadratic fit to the acceleration profile and a conic state propagator. As a result, instead of approximating the velocity and position changes due to the thrust and gravity, the actual dynamics of the spacecraft are simulated for a time, $t_{go}$. While this may require more computational effort (since the state is calculated at each time step instead of only at the point of interest at $t_{go}$), this may have the advantage of being more accurate in general for a given a trajectory. This may also have the advantage of being free to model other non-linear effects such as, but not limited to, aerodynamic forces. In one embodiment, a $\Delta V$ direction may be assumed for the thrusting phase of the skip trajectory. An angle of 45° relative to the local horizontal may, in one embodiment, be assumed for this, although higher or lower angles for $\Delta V$ direction may be utilized in alternative embodiments of the invention.

In one embodiment, the actual direction is chosen using the following equation:

$$(\hat{\lambda}_t)_L = \frac{-1}{\sqrt{2}} \text{sign}(x_e) \begin{bmatrix} 1 \\ 1 \\ 0 \end{bmatrix}_L \quad (22)$$

where $x_e$ is the downrange error. This points the thrust up and forward when the range error is negative (i.e. an undershoot) and down and back when the range error is positive (i.e. an overshoot). In certain embodiments, this direction is specified with respect to the local vertical/local horizontal frame.

In addition to the predictor, numerical integration may also be used for the corrector portion of the algorithm. In this embodiment, instead of using a conic state propagator to solve for the cutoff velocity for a given target, a numerical integration scheme may be used. Here, the algorithm finds the cutoff velocity by using a shooting method to determine the velocity that enables a coasting trajectory to hit the target to within, for example, 1 km of the desired target point. In alternative embodiments, larger or smaller desired target ranges may be used. For example, algorithms described herein may be set to calculate target points within ¼ km, ½ km, ¾ km, 1 km, 2 km, or 10 km, of a given position, although other ranges of target accuracy may be utilized, as appropriate for a particular vehicle and target.

This cutoff velocity can then be then compared to the predicted velocity. If the difference between the two is small enough compared to the magnitude of the velocity remaining, then guidance has converged and the thrust direction parameters are returned for execution. The convergence bound can be set relatively loose if the algorithm is called frequently, or be set more tightly for embodiments where the algorithm is called less frequently. In one embodiment, the tolerance was set to 0.1 with a period of 10 seconds. In alternative embodiments, larger or smaller tolerances, and/or larger or smaller periods, may be set during implementation of the algorithm for a particular skip maneuver. The tolerance is the ratio of the magnitude of the prediction error to the magnitude of the velocity-to-go. The period determines the iterative rate at which the PEG algorithm, or augmented PEG algorithm, is called throughout the trajectory to ensure the target is met despite disturbances to the system.

Guidance algorithm defined herein may allow maneuvers to be performed over a finite amount of time, rather than requiring an impulsive assumption to be made. Such finite-time algorithms allow for improved accuracy and fidelity over prior art methods. While small errors may be nearly impulsive in nature due to their relatively short burn time, larger corrections generally require longer burn time. As a result, removing the impulsive assumption by allowing for finite-time algorithms has the effect of increasing the accuracy of the algorithm by more accurately predicting the burn required to perform a set maneuver, accounting for the time necessary to perform that burn.

In one embodiment, an augmented PEG algorithm is turned on at various normalized inertial angle locations, with a specific period and convergence tolerance set for the algorithm. For example, in one embodiment, the period may be set at a value between 5 seconds and 15 seconds and, for example, at 10 seconds. Similarly, the convergence tolerance may be set at a value between 0.05 and 0.15 and, for example, at 0.1. The algorithm may then be set to run, for example, until the target is reached.

In one embodiment, an augmented algorithm may account for the ability of the thrusters on a spacecraft to actually perform a maneuver given the aerodynamic moments on a capsule. The magnitudes of the aerodynamic moments depend, for example, on the atmospheric density, spacecraft velocity, and shape of the spacecraft, while the propulsive torque provided by the thrusters of a spacecraft are dependent on factors such as their size, power, placement, and orientation on the spacecraft. In one embodiment, to account for aerodynamic and other atmospheric factors, a boundary altitude may be introduced, with the augmented PEG algorithm only being turned on when the spacecraft is above that altitude. In one embodiment, this altitude may be set at a value within a range from 80-120 km and, for example, at 100 km. In other embodiments, a boundary altitude value is not required. For example, in one embodiment, the algorithm may be configured to instruct a spacecraft's propulsive system to perform a propulsive maneuver as soon as possible during a skip maneuver, e.g. to minimize the energy needed, and maximize the time allowed, to perform the required maneuver.

Additional factors may be accounted for in utilizing the algorithms described herein to perform skip trajectory maneuvers. For example, in certain embodiments of the invention, the algorithm may be programmed to favor the utilization of high energy trajectory (i.e. fast and shallow trajectories) maneuvers, which may, in certain embodiments, be more efficient at correcting for possible range errors than low energy trajectory (i.e. slow and steep) maneuvers. In alternative embodiments, algorithms described herein may be selected to utilize any appropriate trajectory requirements, depending upon the requirements of the maneuver, the propulsive and structural capabilities of the spacecraft, and/or the atmospheric conditions being encountered.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method of providing propulsive guidance for atmospheric skip reentry of a space vehicle, comprising the steps of:
    a) calculating a skip reentry flight trajectory for a space vehicle using a powered explicit guidance algorithm during a skip phase;
    b) determining at least one predicted parameter associated with that trajectory;
    c) receiving at least one measured parameter from at least one navigation system instrument;
    d) comparing the at least one predicted parameter with the at least one measured parameter;
    e) determining whether a difference between the at least one predicted parameter and the at least one measured parameter exceeds a threshold value; and
    f) sending a control signal during the skip phase to a propulsion system of the vehicle if the difference between the at least one predicted parameter and the at least one measured parameter exceeds the threshold value.

2. The method of claim 1, wherein at least one predicted parameter and measured parameter comprises a cutoff velocity required by the powered explicit guidance algorithm.

3. The method of claim 2, wherein determining the cutoff velocity comprises using a shooting method to determine a velocity that enables a coasting trajectory to reach a target to within a required tolerance.

4. The method of claim 1, wherein the calculating step comprises numerically integrating equations of motion to account for aerodynamic effects during a skip reentry maneuver.

5. The method of claim 1, wherein the at least one predicted parameter is selected from the group consisting of a velocity, an altitude, a position, a flight path angle, a gravitational force, an aerodynamic force, and an orbital inclination.

6. The method of claim 1, wherein the at least one measured parameter is selected from the group consisting of a velocity, an altitude, a position, a flight path angle, a gravitational force, an aerodynamic force, and an orbital inclination.

7. The method of claim 6, wherein the at least one navigation system is in communication with an instrument associated with the vehicle.

8. The method of claim 1, wherein the control signal adjusts at least one propulsive parameter associated with the propulsion system.

9. The method of claim 8, wherein the propulsive parameter is selected from the group consisting of a thrust force and a thrust direction for at least one engine of the propulsion system.

10. The method of claim 9, wherein the thrust direction of at least one engine is controlled by at least one of a gimbal associated with the engine and reorientation of the vehicle.

11. The method of claim 8, wherein the control signal is determined by numerically integrating equations of motion to account for the difference between at least one predicted parameter and at least one measured parameter.

12. The method of claim 1, further comprising repeating steps a) through f) for a plurality of time steps.

13. The method of claim 12, wherein steps a) through f) are repeated until a final target condition for the skip reentry flight trajectory is achieved.

14. The method of claim 13, wherein the target condition is selected from the group consisting of a required velocity, altitude, position, flight path angle, and orbital inclination.

15. The method of claim 1, further comprising sending a control signal to an aerodynamic surface control system of the vehicle if the difference between at least one predicted parameter and at least one measured parameter exceeds the threshold value.

16. A propulsive guidance system for atmospheric skip reentry of a space vehicle, comprising:
    a means of receiving at least one measured parameter from at least one instrument;
    a control utilizing a powered explicit guidance algorithm adapted to:
        a) calculate at least one predicted parameter associated with a skip reentry flight trajectory for a space vehicle during a skip phase;
        b) compare at least one predicted parameter with at least one measured parameter received from at least one navigation system instrument; and
        c) calculate at least one control signal for a vehicle propulsion system to at least partially compensate for a difference between at least one predicted parameter and at least one measured parameter; and
    a means for transmitting at least one control signal to the vehicle propulsion system during the skip phase.

17. The system of claim 16, wherein the powered explicit guidance algorithm is adapted to repeatedly receive at least one measured parameter and calculate at least one control signal for a plurality of time steps.

* * * * *